United States Patent [19]

Harada

[11] Patent Number: 4,802,022

[45] Date of Patent: Jan. 31, 1989

[54] CABLE TV SYSTEM FOR GUEST FACILITIES

[75] Inventor: Takuji Harada, Hiratsuka, Japan

[73] Assignee: Harada Kogyo Kabushiki Kaisha, Tokyo, Japan

[21] Appl. No.: 26,622

[22] Filed: Mar. 17, 1987

[30] Foreign Application Priority Data

Mar. 26, 1986 [JP] Japan .................................. 61-68002

[51] Int. Cl.⁴ ........................ H04N 7/16; H04N 7/10; H04H 1/00; G05B 23/02
[52] U.S. Cl. ............................... 358/349; 340/286 M; 340/541; 340/825.15; 358/86; 455/4
[58] Field of Search .................... 380/10; 358/86, 349; 455/4; 340/286 R, 286 M, 531, 541, 691, 825.06, 825.15, 825.17, 825.34, 825.31

[56] References Cited

U.S. PATENT DOCUMENTS

| | | | |
|---|---|---|---|
| 3,639,686 | 2/1972 | Walker et al. | 455/4 X |
| 3,882,392 | 5/1975 | Harney | 455/4 |
| 3,968,327 | 7/1976 | Gregg, III | 455/4 X |
| 4,321,593 | 3/1982 | Ho et al. | 340/691 X |
| 4,509,211 | 4/1985 | Robbins | 358/86 X |
| 4,724,425 | 2/1988 | Gerhart et al. | 340/531 X |

Primary Examiner—Stephen C. Buczinski
Assistant Examiner—Linda J. Wallace
Attorney, Agent, or Firm—Koda and Androlia

[57] ABSTRACT

A CATV system for a guest facility such as a hotel including a monitor installed in each room of the facility, an activator for activating the monitor with a signal sent from the front office of the facility, a sensor for detecting a guest who has entered the room and comes close to the monitor, and a display controller for displaying guest information such as a hotel guide on the monitor when the sensor detects the presence of the guest proximity of the monitor.

3 Claims, 2 Drawing Sheets

CABLE TV SYSTEM FOR GUEST FACILITIES

BACKGROUND OF THE INVENTION

1. Field of the Invention

This invention relates to a cable TV (hereinafter called "CATV") system used in guest facilities, and more particularly to a CATV system for automatically showing a guest information in guest facilities such as hotels, etc.

2. Prior Art

Presently, CATV systems are widely used in guest facilities such as hotels, and the system includes monitors installed in each hotel room. The monitor receives a hotel guide channel, regular television channels, pay television channels, etc. In the hotel guide channel, there are usually two different channels; one is an in-house guide channel introducing restaurants, shows, etc. of the hotel, and the other channel shows various different events which occur outside the hotel including a tour guide around the hotel, etc.

When a guest turns on the monitor, it first shows the hotel guide introducing restaurants, shows, etc. Thus, anytime the guest turns on the monitor, he is able to see the hotel guide without missing it, and thus the hotel can provide better overall service to the guests. However, the above-mentioned system has a problem. If the guest does not turn on the monitor, the hotel cannot provide him with the hotel guide. Thus, if the guest does not turn on the monitor immediately after he enters the hotel room, an aim of the hotel to show the guest the hotel guide as soon after he enters the room as possible cannot be achieved.

Also, if the guest never turns on the monitor, the hotel cannot show the hotel guide to the guest even once or provide the guest with a service that a television set in the room is automatically turned on to work as a morning call.

SUMMARY OF THE INVENTION

Accordingly, the present invention was made based upon the problems of the prior art device, and it is a primary object of this invention to provide a CATV system which automatically shows the guest the hotel guide as soon as possible after he enters the hotel room.

In keeping with the principles of this invention, the above object of the present invention is accomplished by a unique CATV system which includes an activation means for activating a monitor installed in a hotel room with a signal from the front office of the hotel to the room, a sensor for detecting a guest coming closer to the monitor, and a display controlling means for displaying information of the hotel after the monitor is made ready to be actuated and a guest in the proximity of the monitor is detected.

BRIEF DESCRIPTION OF THE DRAWINGS

The above mentioned features and objects of the present invention will become more apparent with reference to the following descriptions taken in conjunction with the accompanying drawings, wherein like reference numerals denote like elements, and in which.

DETAILED DESCRIPTION OF THE INVENTION

Figure 1:
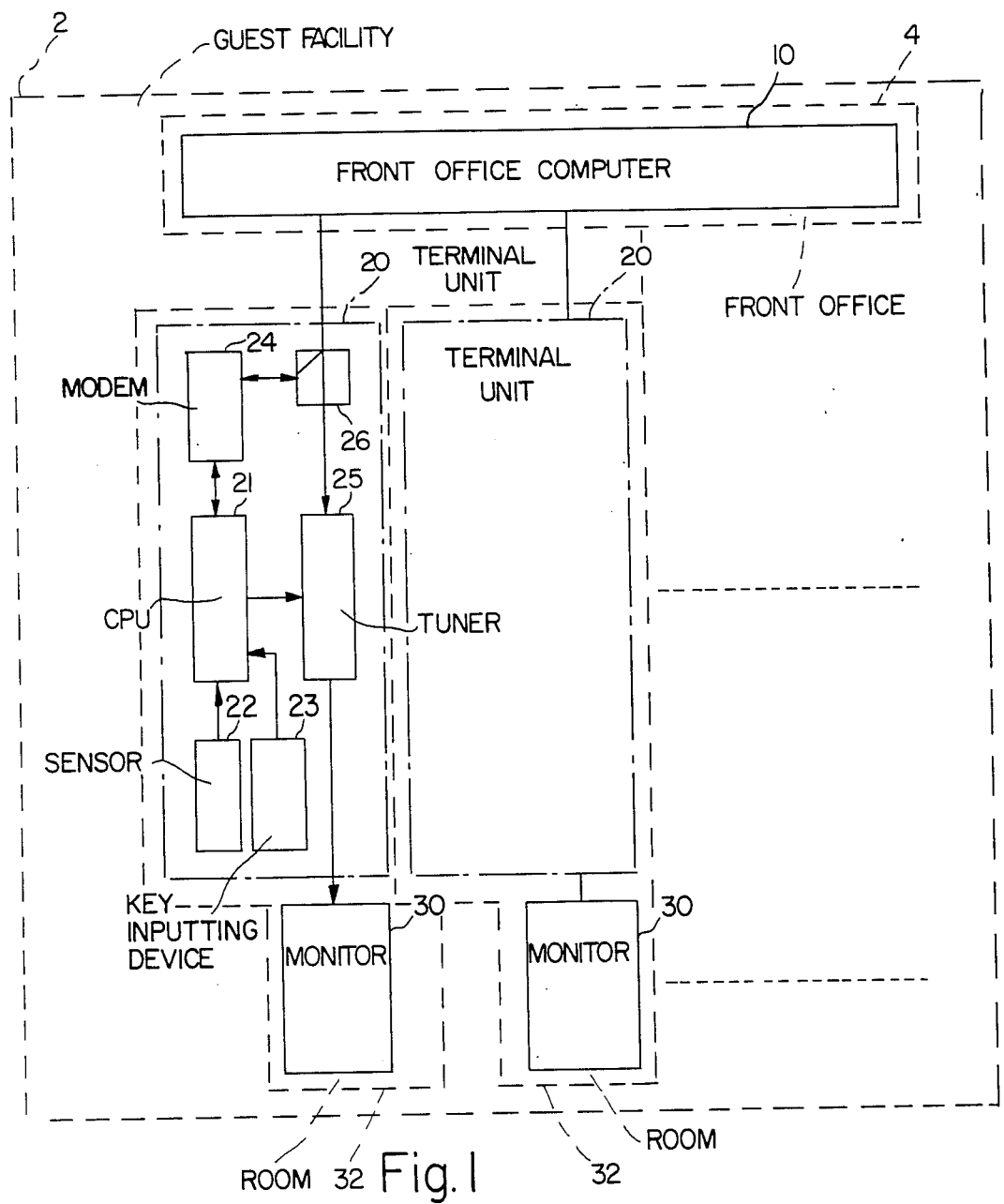
FIG. 1 is a block diagram of an embodiment of the present invention.

FIG. 1 is a block diagram of an embodiment of the present invention. This embodiment includes a front office computer 10, a terminal unit 20, and a CATV picture receiving monitor 30. The front office computer 10 is a computer which controls the whole CATV system in a guest facility such as a hotel, etc. and is provided in the front office 4 of the guest facility 2. The terminal unit 20 and the monitor 30 form a pair which is installed in each room 32 of the guest facility 2.

The terminal unit 20 includes a central processing unit or CPU 21, a detecting sensor 22 for detecting a guest, a key inputting device 23 such as a channel change button, etc., a modem 24 for modulating and demodulating data signals to and from the front office computer 10, and a branching section 26.

The detecting sensor 22 is an infrared radiation sensor or an ultrasonic wave sensor and detects the guests coming close to the monitor 30. The front office computer 10 is an activation means which activates or arms the monitor of each room.

The CPU 21 is an example of a display control means which starts displaying the information including a hotel guide, etc. when the guest enters into the room and comes close to the monitor 30 after the monitor 30 is ready to be activated.

Figure 2:
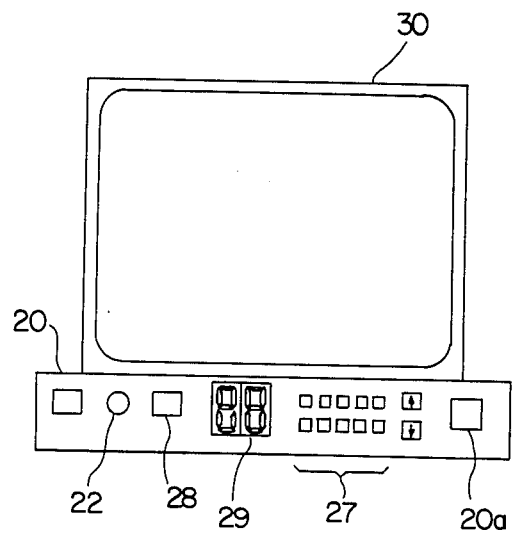
FIG. 2 is a front view of the above embodiment.

FIG. 2 is a front view showing in a concrete manner the terminal unit 20 and the monitor 30. The terminal unit 20 includes, in addition to the elements shown in FIG. 1, a power switch 20a, keys 27 for setting the TV channels and selecting TV games, etc., a button 28 for selecting pay channels, and a seven segment displaying element 29 for displaying the TV channels, etc.

Figure 3:
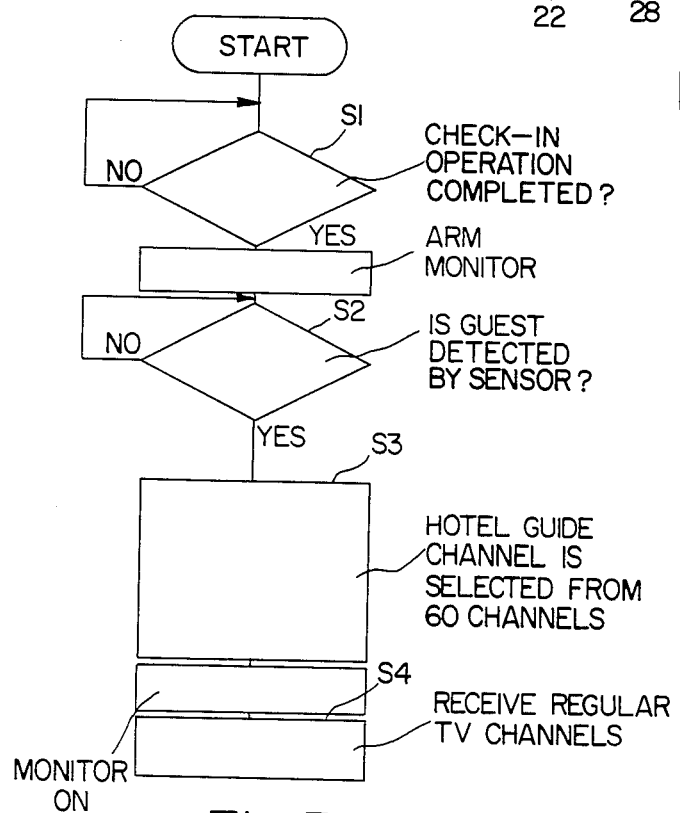
FIG. 3 is a flow chart illustrating the actions in the above embodiment.

The operation of the above described embodiment will be explained below by way of FIG. 3 which is a flow chart illustrating the function.

When check-in is completed for a guest(S1), the check-in information is inputted into the front office computer 10, and it activates the monitor 30 in the checked-in room so that the monitor is ready to function.

After this, the sensor 22 provided in the terminal unit 20 detects if the guest is near the monitor 30 (S2). If the guest has entered the room and is near the monitor 30, the sensor detects the guest, and a predesignated hotel guide channel is automatically selected from the 60 available channels. Then, the power switch 20a is turned on (S3), and the hotel guide program is shown.

When the hotel guide program is completed, the regular TV channel signals are ready to be received (S4), and a desired channel can be selected through the keys 27 or a pay TV channel can be selected through the pay channel button 28. The selected channel number is displayed by the lamp 29.

The above-mentioned hotel guide is started when the guest comes close to the monitor 30. Accordingly, the hotel guide can be shown on the monitor 30 immediately after the guest enters into the room. Thus, a desire of the hotel to show the hotel guide to the guest as soon as possible can be attained by the system of the present invention. When the room is big, the hotel guide program is not shown even when the guest enters the room, but it is shown when the guest comes close to the monitor. Thus, the hotel guest is shown without any failure.

Since it is enough to show the hotel guide only once to the guest after he enters into the room, the hotel guide is programmed to be shown only once automatically.

In the above embodiment, a hotel is used to explain the system of the present invention. However, the system may be used in other type of guest facilities as well, such as inns, etc. Further, instead of a hotel guide, other information of the facilities may be shown by this system.

As mentioned above, the present invention has the feature that the hotel guide can be shown to the guest as soon as possible after the guest comes into the hotel room.

It should be apparent to those skilled in the art that the above described embodiment is merely an illustration of one embodiment which is constructed in accordance with the teachings of the present invention. Numerous and various other arrangements could be readily devised by those skilled in the art without departing from the spirit and scope of the invention.

I claim:

1. A cable TV system for a guest facility comprising:
   a monitor installed in a room of said guest facility which is coupled to said cable TV system;
   an activation means for arming said monitor from a front office of said facility;
   a sensor for detecting a person coming close to said monitor; and
   a display control means for displaying on said monitor predesignated video information of the guest facility which is transmitted over said cable TV system when said monitor is armed and a person near said monitor is detected.
2. A cable TV system according to claim 1, wherein said display control means shows, for only a first time each guest occupies said room, said predesignated information of the guest facility.
3. A cable TV system according to claim 1, wherein said information of the guest facility is a hotel guide channel.

* * * * *